(12) United States Patent
Braeutigam et al.

(10) Patent No.: US 10,717,470 B2
(45) Date of Patent: Jul. 21, 2020

(54) VEHICLE CHASSIS ARRANGEMENT

(71) Applicant: AGCO International GmbH, Neuhausen (CH)

(72) Inventors: Markus Braeutigam, Marktoberdorf (DE); Simon Brack, Marktoberdorf (DE)

(73) Assignee: AGCO International GmbH, Neuhausen (CH)

(*) Notice: Subject to any disclaimer, the term of this patent is extended or adjusted under 35 U.S.C. 154(b) by 139 days.

(21) Appl. No.: 15/876,380

(22) Filed: Jan. 22, 2018

(65) Prior Publication Data

US 2018/0222529 A1    Aug. 9, 2018

(30) Foreign Application Priority Data

Feb. 8, 2017 (GB) ..................... 1702079

(51) Int. Cl.

| B62D 21/18 | (2006.01) |
|---|---|
| B60K 17/16 | (2006.01) |
| B62D 5/06 | (2006.01) |
| F16H 57/029 | (2012.01) |
| F16H 57/031 | (2012.01) |
| F16H 57/037 | (2012.01) |
| F16H 57/025 | (2012.01) |
| B62D 21/16 | (2006.01) |

(52) U.S. Cl.
CPC ............ *B62D 21/186* (2013.01); *B60K 17/16* (2013.01); *B62D 5/062* (2013.01); *B62D 21/16* (2013.01); *F16H 57/025* (2013.01); *F16H 57/029* (2013.01); *F16H 57/031* (2013.01); *F16H 57/037* (2013.01); *B60Y 2200/221* (2013.01)

(58) Field of Classification Search
CPC ....... B62D 21/186; B62D 5/062; B60K 17/16
See application file for complete search history.

(56) References Cited

U.S. PATENT DOCUMENTS

| 5,456,068 A | 10/1995 | Norihiri et al. |
| 6,324,842 B1 | 12/2001 | Norihiri |
| 6,470,991 B1 | 10/2002 | Bowman et al. |
| 6,745,565 B1 | 6/2004 | Wahner et al. |
| 9,809,110 B2* | 11/2017 | Nakamura ............. F02B 61/02 |
| 2017/0218808 A1* | 8/2017 | Kurokawa ............. F02M 26/22 |
| 2017/0218832 A1* | 8/2017 | Kurokawa ........... F01N 13/1805 |

FOREIGN PATENT DOCUMENTS

| GB | 2120987 A | 12/1983 |
| JP | 2000234662 A | 8/2000 |

OTHER PUBLICATIONS

European Patent Office, International Search Report for related EPO Application No. 18151328.4, dated Jul. 10, 2018.
UK Intellectual Property Office, International Search Report for related UK Application No. GB1702079.3, dated Jul. 4, 2017.

* cited by examiner

*Primary Examiner* — Faye M Fleming

(57) ABSTRACT

A vehicle chassis arrangement, preferably for use in an agricultural tractor. The chassis has two frame elements and a differential housing, where the ends of the frame elements are connected to the side of the differential housing facing the rear of the vehicle. A tank cover is attached adjacent to that side of the differential housing, to define a fluid storage tank between the tank cover and the surface of the differential housing.

20 Claims, 4 Drawing Sheets

VEHICLE CHASSIS ARRANGEMENT

BACKGROUND OF THE INVENTION

Field of the Invention

The present invention relates to a vehicle chassis arrangement, in particular a tractor chassis arrangement having an integrated tank.

Description of Related Art

With conventional agricultural tractors the housings of the drive train also serve as the load bearing structure of the vehicle. The housings may comprise for example, a transmission housing, a clutch housing and an oil sump. It is typical for a chassis of a tractor to be formed partly from a combination of such housings and partly from a frame connected to one of the housings. In such an arrangement, the housings are bolted together in a linear manner and an end housing is connected to a linear frame to form the chassis which upon which a cab, radiator arrangement and an engine are mounted.

In one arrangement, one end of a differential housing is connected to a frame comprising two parallel frame members which extend parallel to the longitudinal axis of the chassis. The frame members may be provided with struts extending between the frame members to re-inforce the structure. In such arrangements a tank for holding hydraulic oil to be used by the transmission parts is connected lengthways to the side of the transmission housing.

However, having a tank at the side of the housing increases the width of the chassis and makes the tank more vulnerable to damage. Moreover, the tank is attached to the housing by brackets and bolts necessitating the housing to be provided with appropriate bolt holes. Oil from the tank can be used to supply components which may be located quite a distance from the tank, and thus requires the use of lengthy tubing/piping which can be easily damaged.

As a result, there is a need to provide a tractor chassis and hydraulic tank arrangement which overcomes, or at least alleviates the above mentioned problems.

SUMMARY OF THE INVENTION

Accordingly, there is provided a vehicle chassis arrangement for a vehicle wherein the chassis comprises at least one frame element and a differential housing, an end of the at least one frame element connected to a side of the differential housing, wherein a tank cover is attached adjacent to said side of the differential housing to form a fluid storage tank defined between the tank cover and the side of the differential housing.

Providing a fluid storage tank which can easily be located adjacent the differential housing allows for vehicle fluid to be stored in a convenient location, which results in a space-saving construction, as well as minimizing the piping or tubing for the supply of fluid from the tank to fluid consumers on the vehicle. The fluid tank may be used for the storage of any suitable fluid, preferably hydraulic oil.

Preferably, the at least one frame element is connected to the side of the differential housing arranged to face in the rearward direction of the vehicle.

Preferably, the chassis arrangement further comprises two frame elements, the ends of the frame elements connected to the side of the differential housing to form a chassis frame.

Preferably, the tank cover is located between the frame elements.

Positioning the fluid tank between the frame elements allows for the fluid tank to be protected by the structurally sound frame of the vehicle.

Preferably, the tank cover is provided with a shaft aperture.

As the tank cover is shaped to accommodate a vehicle shaft, e.g. a transmission shaft, accordingly the fluid tank is arranged to fit in with the constructional components of the vehicle.

Preferably, the tank cover is arranged centrally and parallel to the longitudinal axis of the vehicle chassis arrangement.

Preferably, a volume of the fluid storage tank defined between the tank cover and the side of the differential housing is formed from:
  a first volume section defined between a first portion of the tank cover and a first portion of the differential housing, and
  a first volume section defined between a second portion of the tank cover and a second portion of the differential housing.

Preferably, the first volume section forms a lower volume section of the fluid storage tank, and the second volume section forms an upper volume section of the fluid storage tank, and wherein the upper volume section projects beyond the lower volume section.

Preferably, the at least one frame element comprises a reinforcement member arranged transverse to the longitudinal axis of the vehicle chassis arrangement, wherein the upper volume section of the fluid storage tank is at least partly supported by the reinforcement member.

Providing a partial support of the tank cover by the structural elements of the chassis frame helps to distribute the forces about the vehicle chassis frame.

Preferably, a hydraulic pump, further preferably a steering pump, is at least partly accommodated in the space defined adjacent the lower volume section and beneath the upper volume section of the fluid storage tank.

As a hydraulic pump such as a steering pump may be arranged as a primary consumer of fluid contained in the fluid storage tank, positioning such a pump in the space adjacent the tank allows for the fluid connection elements between the tank and the pump to be minimized, thereby reducing cost.

Preferably, the tank cover is provided with flanges for attaching the tank cover to the differential housing.

Preferably, the tank cover is provided with sealing surfaces for sealing between the tank cover and the differential housing.

In a further aspect, it will be understood that the tank cover may be provided with at least one sensor to monitor the level of fluid contained in the defined fluid storage tank. Alternatively, at least one sensor may be provided as a separate component arranged to be positioned within the fluid storage tank defined between the tank cover and the side of the differential housing.

There is further provided an agricultural tractor comprising a vehicle chassis arrangement as described above.

BRIEF DESCRIPTION OF THE DRAWINGS

Embodiments of the invention will now be described, by way of example only, with reference to the accompanying drawings, in which.

The drawings are provided by way of reference only, and will be acknowledged as not to scale.

DETAILED DESCRIPTION OF THE INVENTION

Figure 1:
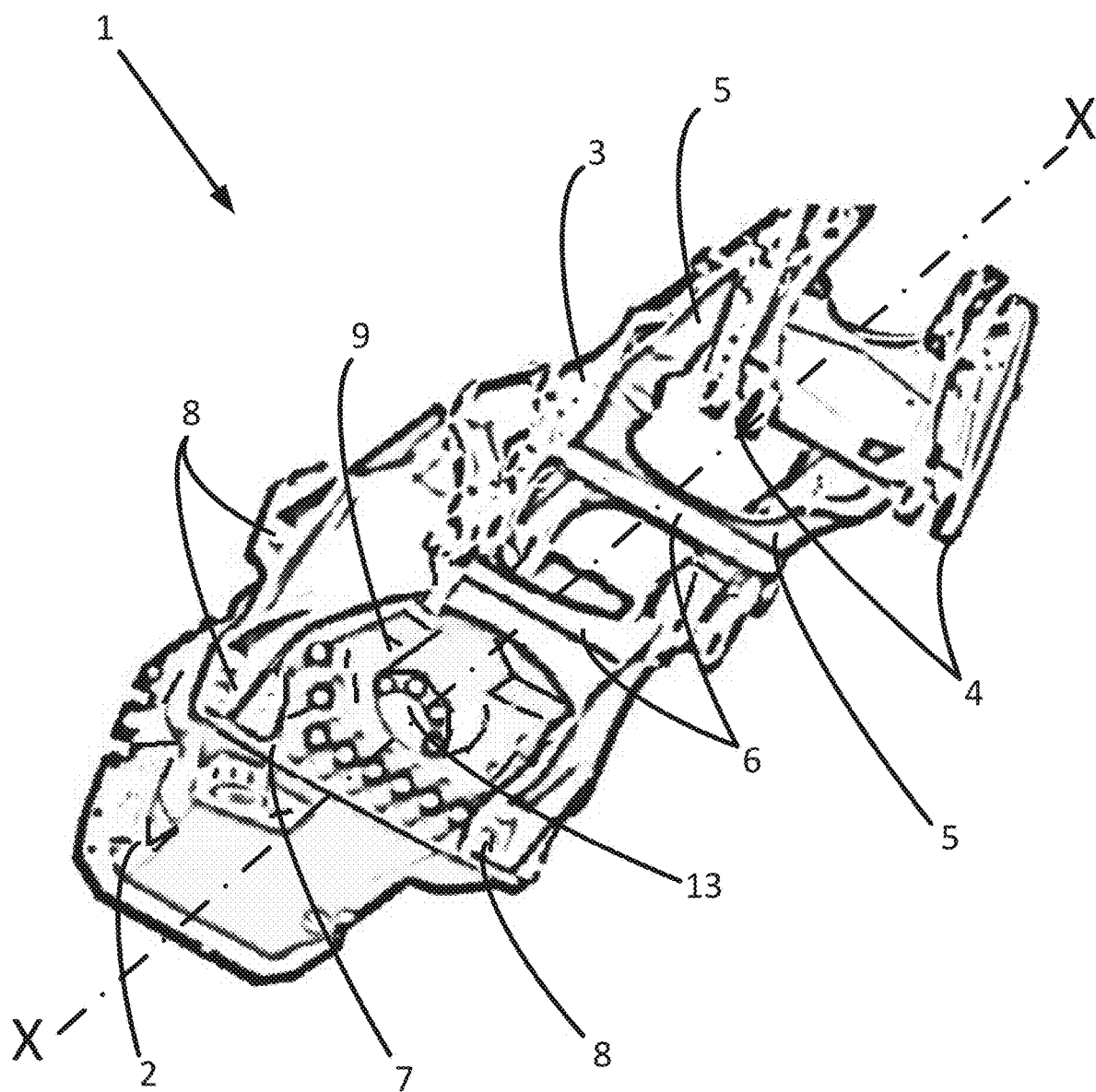
FIG. 1 is a perspective view of a tractor chassis arrangement in accordance with an embodiment of the invention.
Figure 2:
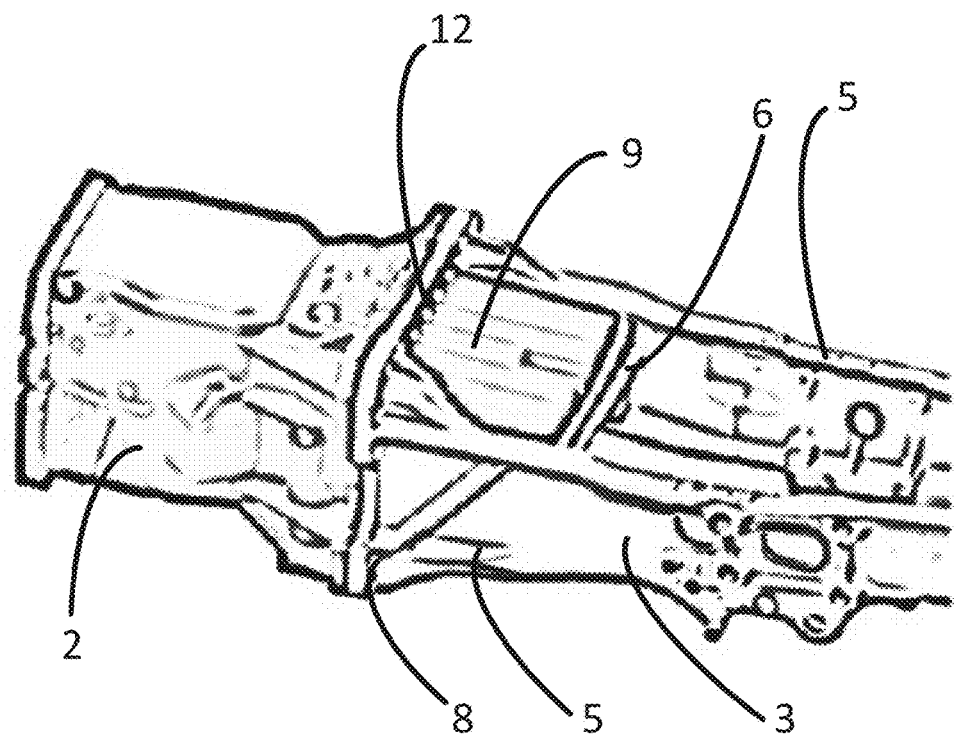
FIG. 2 is a further perspective view of a tractor chassis arrangement of FIG. 1.
Figure 3:
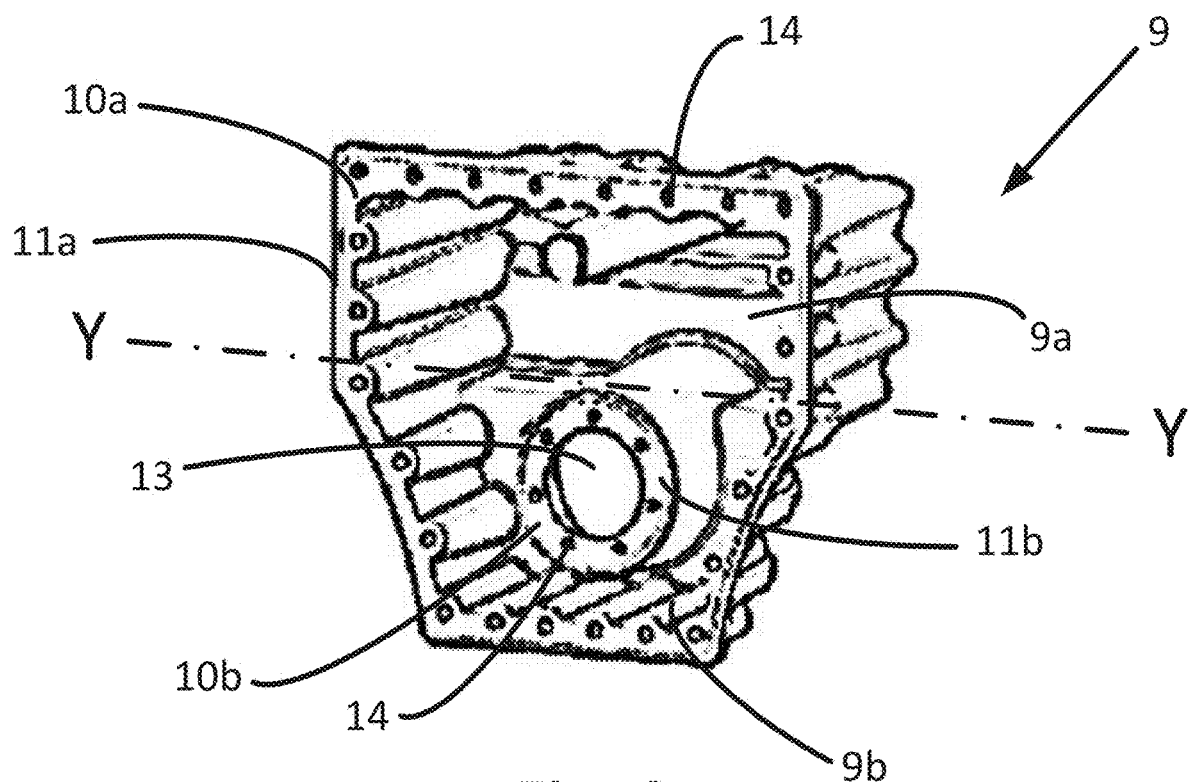
FIG. 3 is a perspective view of a tank cover in accordance with the invention.
Figure 4:
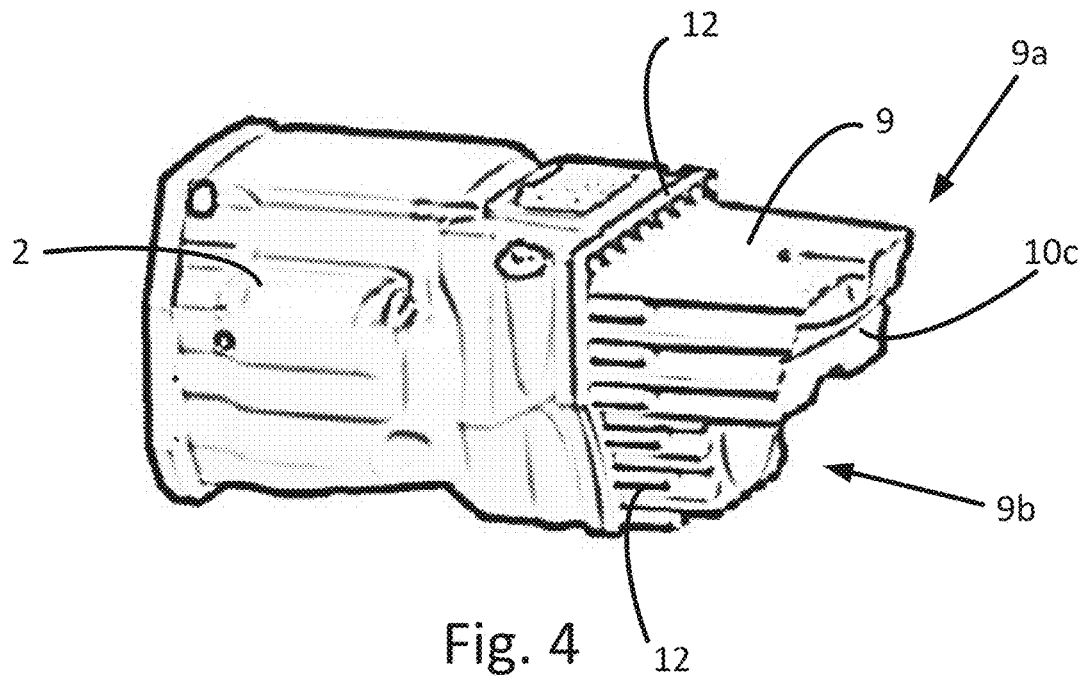
FIG. 4 is an enlarged view showing the connection of a tank to a differential housing in accordance with the invention.
Figure 5:
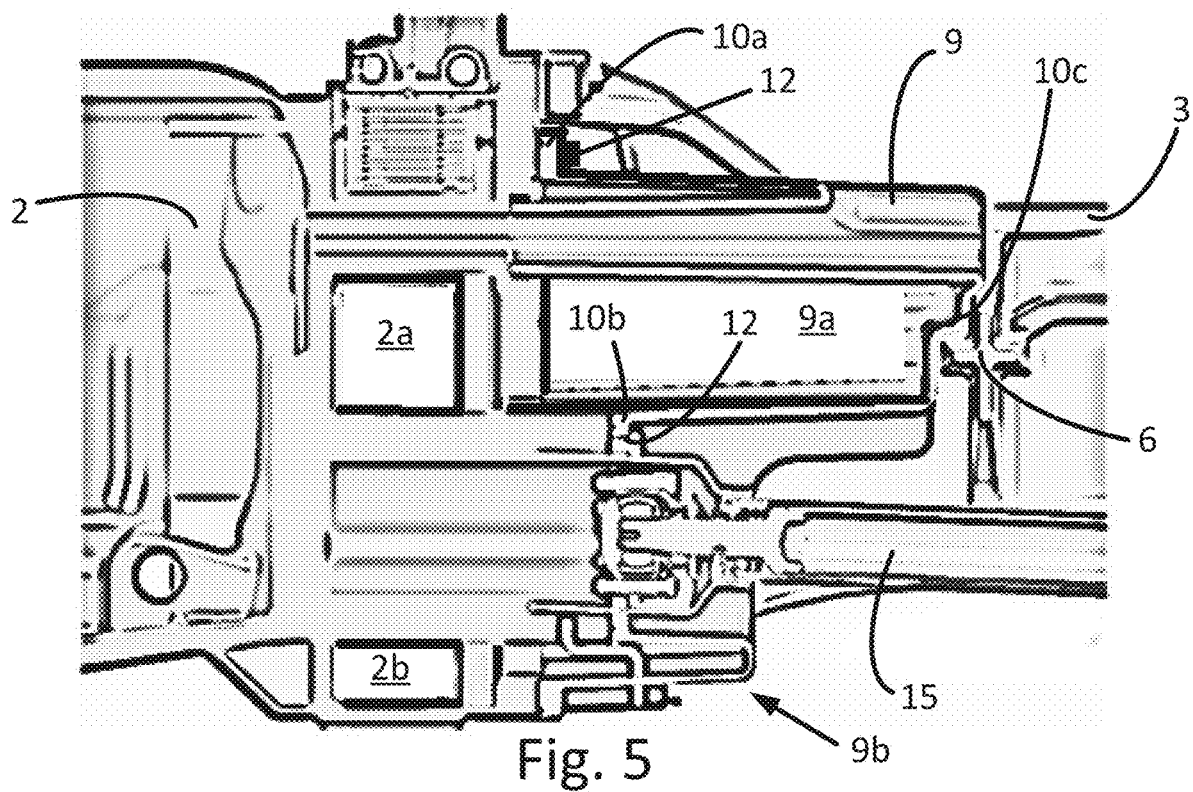
FIG. 5 is a sectional view of the tank cover and differential housing showing a tank accordance with the invention.

FIG. 1 is a perspective view from below of an agricultural tractor chassis 1 formed from a differential housing 2 and a frame 3. The differential housing extends towards the rear of the tractor whereas the frame extends towards the front of the tractor and is provided with attachment means 4 for attaching a power lift thereto. The frame comprises two parallel members 5 which extend longitudinally from the differential housing parallel to the longitudinal axis X-X of the tractor. Two reinforcement members 6 extend transversely to the longitudinal axis between each parallel member to strengthen the frame 3.

To attach the frame to the differential housing, a rearward facing surface 7 of the differential housing 2 is provided with bolt holes for receiving bolts 8. The bolts extend through the frame 3 and differential housing 2 parallel to the longitudinal axis X-X. In accordance with the invention and as shown in figures, a tank cover 9 is also fitted to the rear facing surface 7 of the differential housing 2 and is located between the parallel members 5 and one of the reinforcement members 6 of the frame 3. One side of tank cover 9 has a similar cross sectional area to the rear facing surface of the differential housing.

The tank cover 9 also comprises a shaft aperture 13 through which a drive shaft 15 from the differential housing can extend.

Tank cover 9 is provided with two flanges 10a and 10b, one is located around its perimeter and the other one is located around aperture 13. The flanges 10a and 10b are provided with bolt holes 14. The differential housing 2 is also provided with bolt holes, to receive bolts 12 to attach the tank cover 9 to the side of the housing facing the rear of the tractor.

On the flanges 10a and 10b sealing surfaces 11a and 11b are provided for receiving a seal for sealing between tank cover 9 and differential housing 2.

A volume of a fluid tank is defined by tank cover 9 and the differential housing 2. Thereby the differential housing is in such a way manufactured that on the rear facing surface 7 volume sections 2a and 2b are formed and also tank cover 9 is formed with volume sections 9a and 9b.

Upper volume sections 9a and 2a defines a volume of the tank above a midline Y-Y of the tank where the mid line is taken to extend transverse to the longitudinal axis across the tank. Lower volume sections 9b and 2 define a volume of the tank below the mid line. Volume sections 9a and 9b extend towards the rear of the tractor parallel to the longitudinal axis X-X. The upper volume section 9a extends further or projects beyond the lower volume section 9b in the rearward direction. The upper volume section 9a "sits" with a protrusion 10c on the reinforcement member 6. On the lower volume section 9b it is possible to attach a steering pump, either on the left or right side of the shaft aperture 13.

As with the attachment of the frame 3, the bolts 12 extend into the housing 2 parallel to the longitudinal axis X-X. In this way tank cover 9 is attached to the housing 2 so that it extends parallel to the longitudinal axis X-X between parallel members 5 and is integrated within the chassis. The tank cover 9 is a one piece manufactured by injection moulding.

In this position, the tank cover 9 is protected by the frame 3. By using the fluid tank built from the tank cover 9 and differential housing 2 a damping behaviour occurs due to of the characteristic of the oil (e.g. hydraulic oil). Also the pipes/hoses from the fluid tank to consumers can be shorter because the fluid tank is located in a position closer to the consumers.

Therewith unused space is used and by position the tank and tank cover between the parallel frame members 5 of the frame 5 a hood can have a smaller form.

Figure 6:
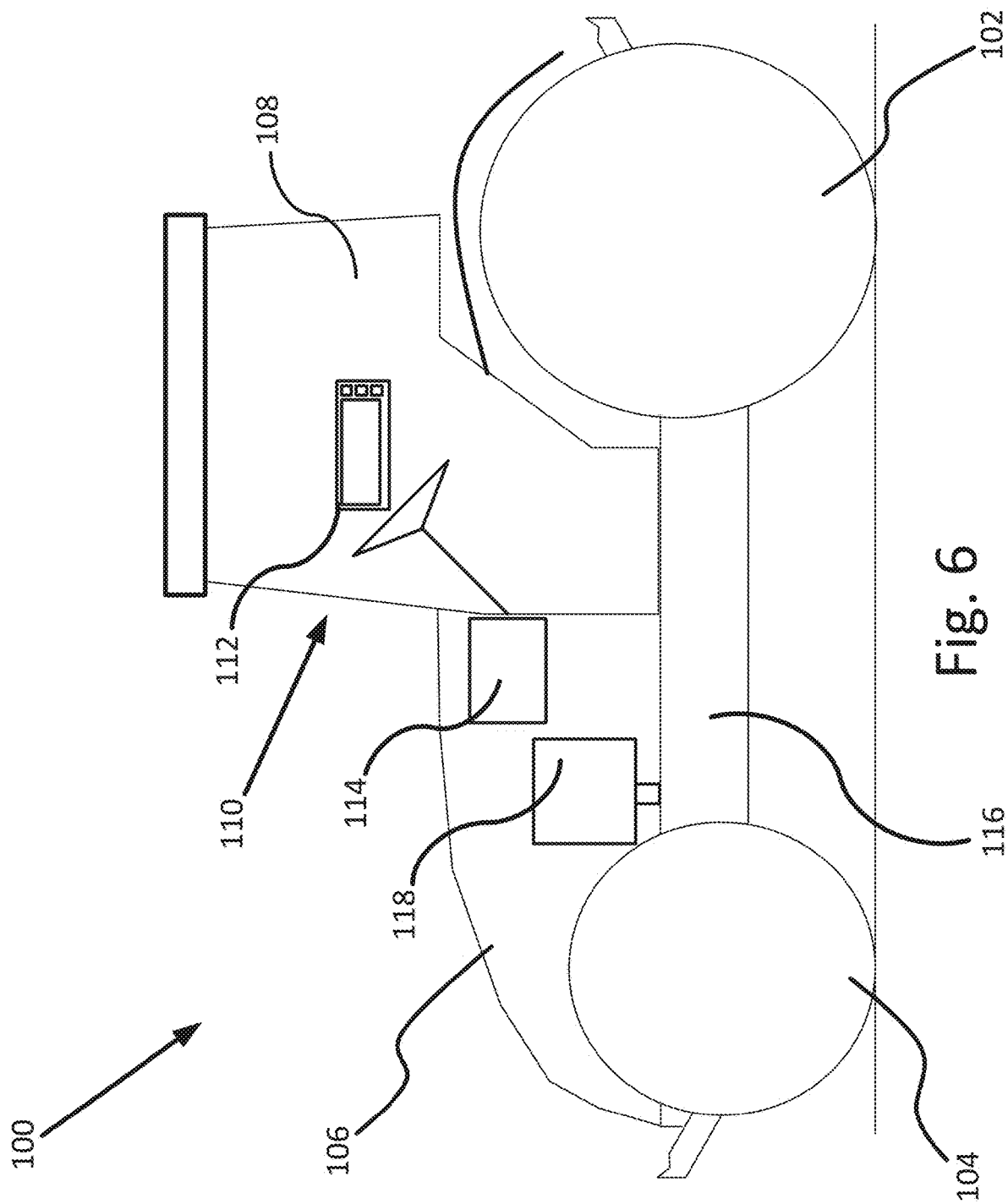
FIG. 6 is an illustration of an agricultural tractor having a tractor chassis arrangement in accordance with the invention.

In a preferred embodiment of the invention, the chassis arrangement is provided as forming a portion of the chassis of an agricultural tractor. With reference to FIG. 6, an agricultural tractor according to the invention is indicated at 100. The tractor 100 comprises rear wheels 102 and front wheels 104, a forward engine compartment 106 and a cab section 108.

Within the cab 108, an operator station 110 is provided, where the operator can access a display terminal and associated operator controls 112, as well as a steering wheel or other associated steering controls. The tractor 100 is provided with at least one electronic control unit (ECU) 114, which is configured to interface with the operator controls 112 and with the various systems and sensors provided about the tractor 100, to provide for monitoring and control of tractor operation. The controls 112 and ECU 114 allow the operator to actuate different elements of the tractor 100, e.g. hydraulic circuits, lifting systems, HVAC operation, and/or to control the acceleration and steering of the tractor 100.

The tractor 100 comprises a chassis arrangement 116, configured as described above in relation to FIGS. 1-5. A fluid tank provided by the chassis arrangement 116 may be coupled with a suitable fluid consumer component 118 provided in the tractor 100. As a result, the tractor 100 is constructed having an improved location for a fluid storage tank, which may be located closer to components arranged as consumers of the contained fluid.

The invention is not limited to the embodiments described herein, and may be modified or adapted without departing from the scope of the present invention.

The invention claimed is:

1. A vehicle chassis arrangement for a vehicle wherein the chassis comprises a first frame element, a second frame element and a differential housing, an end of the first frame element connected to a side of the differential housing to form a chassis frame, wherein a tank cover is attached adjacent to the side of the differential housing to form a fluid storage tank defined between the tank cover and the side of the differential housing.

2. The vehicle chassis arrangement of claim 1, wherein the first frame element is connected to the side of the differential housing arranged to face in the rearward direction of the vehicle.

3. The vehicle chassis arrangement of claim 1, wherein the tank cover is located between the frame elements.

4. The vehicle chassis arrangement of claim 1, wherein the tank cover is provided with a shaft aperture.

5. The vehicle chassis arrangement of claim 1, wherein the tank cover is arranged centrally and parallel to the longitudinal axis of the vehicle chassis arrangement.

6. The vehicle chassis arrangement of claim 1, wherein a volume of the fluid storage tank defined between the tank cover and the side of the differential housing is formed from:
   a first volume section defined between a first portion of the tank cover and a first portion of the differential housing; and
   a first volume section defined between a second portion of the tank cover and a second portion of the differential housing.

7. The vehicle chassis arrangement of claim 6, wherein the first volume section forms a lower volume section of the fluid storage tank, and the second volume section forms an upper volume section of the fluid storage tank, and wherein the upper volume section projects beyond the lower volume section.

8. The vehicle chassis arrangement of claim 7, wherein the first frame element comprises a reinforcement member arranged transverse to the longitudinal axis of the vehicle chassis arrangement, wherein the upper volume section of the fluid storage tank is at least partly supported by the reinforcement member.

9. The vehicle chassis arrangement claim 7, wherein a hydraulic pump is at least partly accommodated in the space defined adjacent the lower volume section and beneath the upper volume section of the fluid storage tank.

10. The vehicle chassis arrangement of claim 1, wherein the tank cover is provided with flanges for attaching the tank cover to the differential housing.

11. The vehicle chassis arrangement of claim 1, wherein the tank cover is provided with sealing surfaces for sealing between the tank cover and the differential housing.

12. An agricultural tractor comprising the vehicle chassis arrangement of claim 1.

13. A vehicle chassis arrangement for a vehicle wherein the chassis comprises at least one frame element and a differential housing, an end of the at least one frame element connected to a side of the differential housing;
   wherein a tank cover is attached adjacent to said side of the differential housing to form a fluid storage tank defined between the tank cover and the side of the differential housing;
   wherein a volume of the fluid storage tank defined between the tank cover and the side of the differential housing is formed from:
      a first volume section defined between a first portion of the tank cover and a first portion of the differential housing; and
      a first volume section defined between a second portion of the tank cover and a second portion of the differential housing;
   wherein the first volume section forms a lower volume section of the fluid storage tank, and the second volume section forms an upper volume section of the fluid storage tank, and wherein the upper volume section projects beyond the lower volume section.

14. The vehicle chassis arrangement of claim 13, wherein the at least one frame element comprises a reinforcement member arranged transverse to the longitudinal axis of the vehicle chassis arrangement, wherein the upper volume section of the fluid storage tank is at least partly supported by the reinforcement member.

15. The vehicle chassis arrangement claim 13, wherein a hydraulic pump is at least partly accommodated in the space defined adjacent the lower volume section and beneath the upper volume section of the fluid storage tank.

16. The vehicle chassis arrangement of claim 13, wherein the tank cover is provided with flanges for attaching the tank cover to the differential housing.

17. The vehicle chassis arrangement of claim 13, wherein the tank cover is provided with sealing surfaces for sealing between the tank cover and the differential housing.

18. The vehicle chassis arrangement of claim 13, wherein the at least one frame element is connected to the side of the differential housing arranged to face in the rearward direction of the vehicle.

19. The vehicle chassis arrangement of claim 13, wherein the tank cover is arranged centrally and parallel to the longitudinal axis of the vehicle chassis arrangement.

20. An agricultural tractor comprising the vehicle chassis arrangement of claim 13.

* * * * *